United States Patent [19]
Eberle

[11] Patent Number: 6,116,810
[45] Date of Patent: Sep. 12, 2000

[54] DEVICE FOR FIXING WIRES OF OBJECTS SIMILAR TO WIRE

[75] Inventor: Jürg Eberle, Hinwill, Switzerland

[73] Assignee: IPT Weinfelden AG, Weinfelden, Germany

[21] Appl. No.: 09/052,529

[22] Filed: Mar. 31, 1998

[30] Foreign Application Priority Data

Apr. 7, 1997 [CH] Switzerland .............................. 0801/97

[51] Int. Cl.[7] .................................................... F16L 3/22
[52] U.S. Cl. ........................ 403/391; 403/396; 403/364; 248/68.1; 248/74.1
[58] Field of Search .................................. 403/391, 389, 403/396, 395, 385, 364, 399, 398; 248/68.1, 74.1

[56] References Cited

U.S. PATENT DOCUMENTS

| | | | |
|---|---|---|---|
| 368,467 | 8/1887 | Fouts | 248/74.1 X |
| 2,231,462 | 2/1941 | Cobb | 248/68.1 X |
| 3,052,751 | 9/1962 | Volk et al. | 248/68.1 X |
| 3,121,772 | 2/1964 | Zurwelle | 248/68.1 X |
| 4,082,917 | 4/1978 | Hendrix | 248/74.1 X |
| 5,703,330 | 12/1997 | Kujawski | 248/68.1 |

FOREIGN PATENT DOCUMENTS

| | | |
|---|---|---|
| 0 173 805 | 6/1985 | European Pat. Off. . |
| 195 16 478 A1 | 11/1996 | Germany . |
| 195 15 465 A1 | 10/1997 | Germany . |
| 2 1 37 684 | 3/1983 | United Kingdom . |
| WO90/02269 | 8/1989 | WIPO . |

Primary Examiner—Terry Lee Melius
Assistant Examiner—John Cottingham
Attorney, Agent, or Firm—Lacasse & Associates; Randy W. Lacasse

[57] ABSTRACT

Wires (D.4 to D.9) or objects similar 10 wires are fixed in predetermined positions by a device with pairs of clamping jaws (3.4/4.4 to 3.9/4.9). The device has at least two flat jaw elements (3, 4) lying against each other and being at least restrictedly slewable against each other around a center (M) and it further has holders (20). Each of the jaw elements (3, 4) has one clamping jaw (3.4 to 3.9, 4.4 to 4.9) for each one of a plurality of fixing points arranged on a circle (K.3) around the center (M) which clamping jaws are designed for exerting tangential clamping forces directed tangentially to the circle (K.3) on wires (D.4 to D.9) fixed in the fixing points. Hereby, clockwise clamping forces are exertable with the one jaw element and counter-clockwise clamping forces are exertable with the other jaw element. By slewing the jaw elements (3, 4) against each other the pairs of jaws are opened and closed. With arrangements of fixing points which have a symmetry-plane (S) the jaw elements represent mirrored images of each other, i.e. they are identical and are arranged relative to each other with one of them turned by 180°.

17 Claims, 4 Drawing Sheets

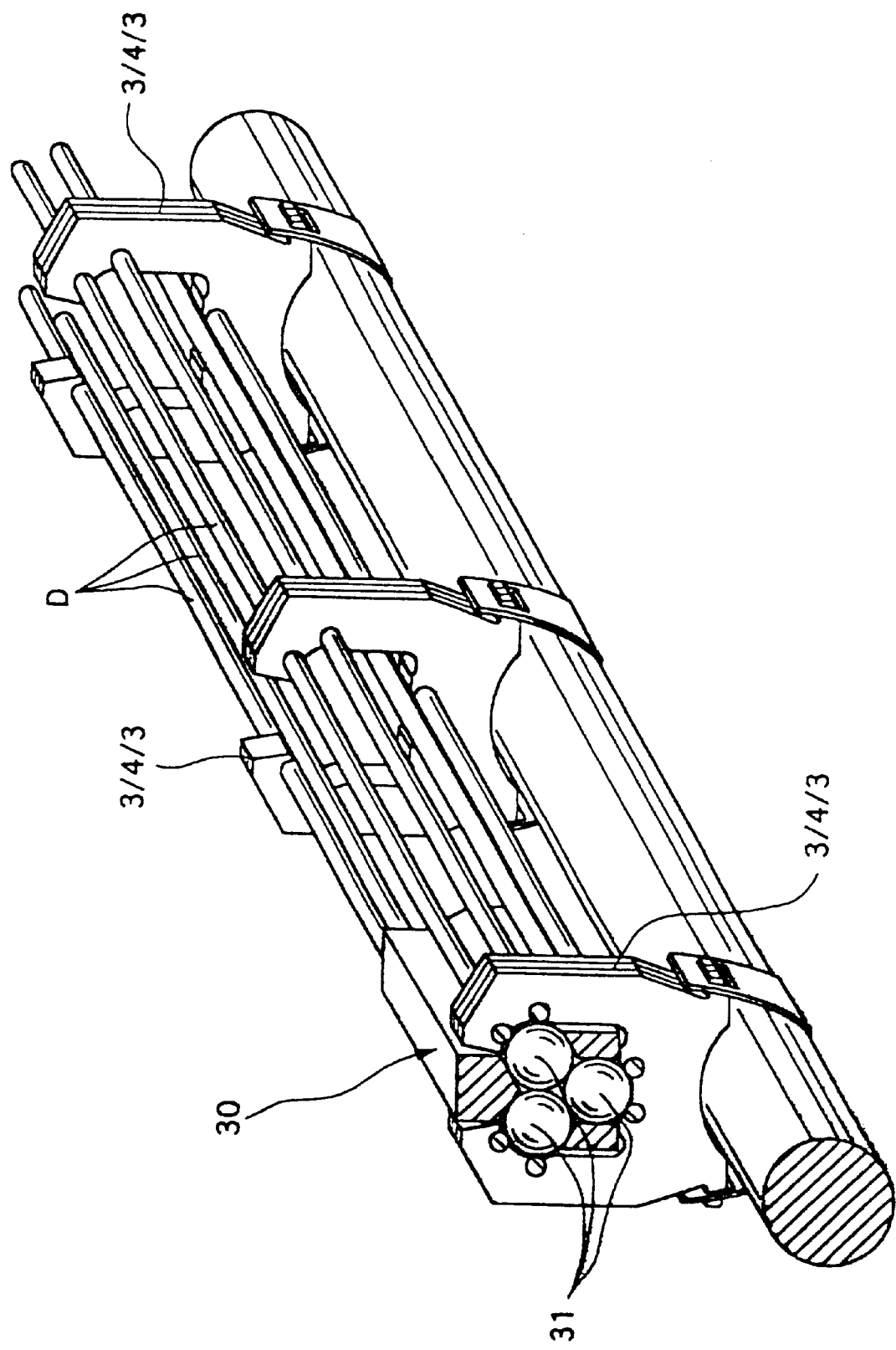

DEVICE FOR FIXING WIRES OF OBJECTS SIMILAR TO WIRE

FIELD OF THE INVENTION

The invention concerns a device according to the generic part of the first independent claim. The device serves for fixing wires or objects similar to wire.

BACKGROUND OF THE INVENTION

If a wire or an object similar to a wire is to be held in a defined position at least discrete fixing means dispersed over the length of the wire must be provided with the help of which the wire is positionable precisely and is fixable in the intended position. This kind of fixing means e.g. comprises guidances and fixing screws which co-operate for the positioning and fixing of the wire or they comprise pairs of clamping jaws which are movable against each other and are fixable in a closed position.

If several wires are to be positioned and fixed in parallel to each other over great lengths of wire using the fixing means described above, a great deal of work is necessary because each wire must be positioned and fixed to each fixing point individually.

The object of the invention is to create a device for fixing wires or objects similar to wires, in particular in an arrangement in which they are parallel to each other. The device is to be produceable at minimal cost and the wires or objects similar to wires are to be positionable and fixable using the inventive device with a minimum of work.

This object is achieved with the device as defined in the claims.

SUMMARY OF THE INVENTION

The inventive device for fixing wires or objects similar to wires substantially consists of at least two flat jaw elements arranged to substantially lie against one another and of a holding means. The jaw elements consist of a sheet material from which they are produceable e.g. by punching. Their edges are formed such that each jaw element comprises one clamping jaw in a plurality of fixing points and such that a pair of jaws is formed at each fixing point by the one clamping jaw of each of the at least two jaw elements. The fixing points are arranged on concentric circles and the pairs of clamping jaws are designed such that they can exert clamping forces acting tangentially to the concentric circles on wires or objects similar to wires to be fixed, namely in a clockwise direction by the clamping jaws of one jaw element and in a counter-clockwise direction by the clamping jaws of the other jaw element.

The at least two jaw elements are connected to each other in at least restrictedly slewable manner around the center of the concentric circles with the aid of suitable means, by which slewability the pairs of clamping jaws are opened and closed. The at least two jaw elements are held by the holding means in a position such that the pairs of clamping jaws are pressed into a closed position and thus are pressed against wires to be fixed in the fixing points.

It is advantageous to design the fixing points such that they are arranged symmetrically relative to a plane of symmetry laid through the center of the concentric circles, whereby it is not a condition that wires are fixed in all fixing points. In such a case the at least two jaw elements are designed identical and then for combining them, one is turned by 180° relative to the other one.

The holding element can additionally to its holding function of the jaw elements in a position in which the clamping jaws are closed adopt a fixing function with which the jaw elements are fixable to a support.

In order to prevent wires fixed in fixing points from being bent it is advantageous to arrange at least three jaw elements lying against each other, whereby the clamping jaws of the two outer jaw elements are identical and the clamping jaws of the middle jaw elements act against the clamping jaws of the outer jaw elements. In the case of the symmetrical jaw elements mentioned above, three identical jaw elements with alternating rotation positions are used.

BRIEF DESCRIPTION OF THE DRAWINGS

By means of the following Figures two exemplified embodiments of the inventive device for fixing wires or objects similar to wires are to be described in more detail, whereby:

FIG. 6 shows an exemplified use of the embodiment of the inventive device according to FIGS. 4 and 5.

DETAILED DESCRIPTION OF THE INVENTION

Figure 1:
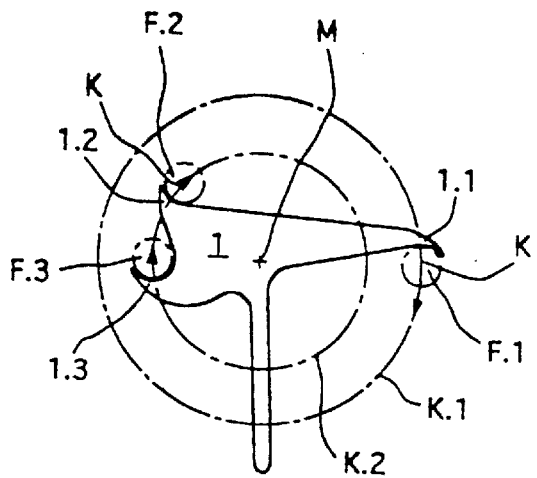
FIGS. 1 and 2 show two jaw elements of a first exemplified embodiment of the inventive device for fixing wires or objects similar to wires.
Figure 2:
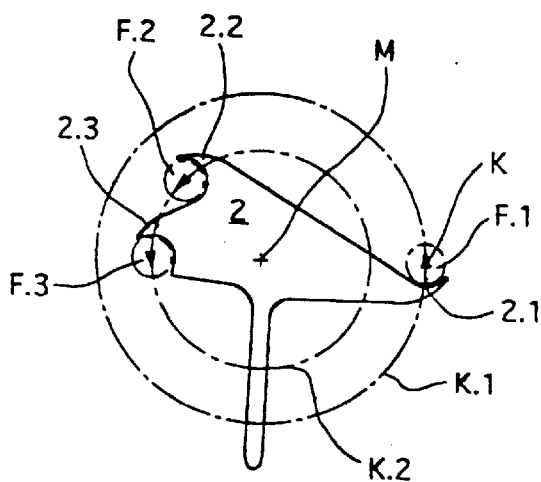

FIGS. 1 and 2 show two jaw elements 1 and 2 for a first, exemplified embodiment of the inventive device. They are both produced from a sheet material (e.g. plastic or metal) and are shown in top view.

Both jaw elements comprise one clamping jaw 1.1 to 1.3 or 2.1 to 2.3 respectively for each of three fixing points F.1 to F.3 which fixing points are arranged on two concentric circles K.1 and K.2 with a center M, whereby the clamping jaws 1.1 to 1.3 of jaw element 1 are designed for clamping forces K with a tangential direction acting clockwise on one of the concentric circles K.1 or K.2 respectively and the clamping jaws 2.1 to 2.3 of the other jaw element 2 for corresponding counter-clockwise clamping forces.

Figure 3:
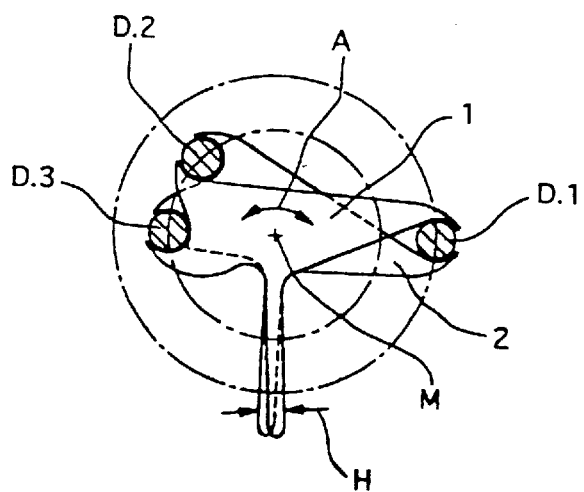
FIG. 3 shows the jaw elements of FIGS. 1 and 2 arranged lying against each other.

FIG. 3 shows the two jaw elements 1 and 2 lying against each other (jaw element 1 directed towards the viewer) and being connected with each other with suitable, not shown connecting means (e.g. a bolt through an opening in M) such that they are slewable against each other around the center M in an at least restricted manner (double arrow A), whereby the jaw pairs 1.1/2.1, 1.2/2.2 and 1.3/2.3 are opened or closed respectively.

By means of a force H which is exerted on the jaw elements by suitable, not shown holding means the jaw elements are pressed into a position in which the clamping jaws are pressed onto wires D.1 to D.3 positioned in the fixing points and thus fix these, whereby it is not a condition that wires are positioned in all of the fixing points.

Figure 4:
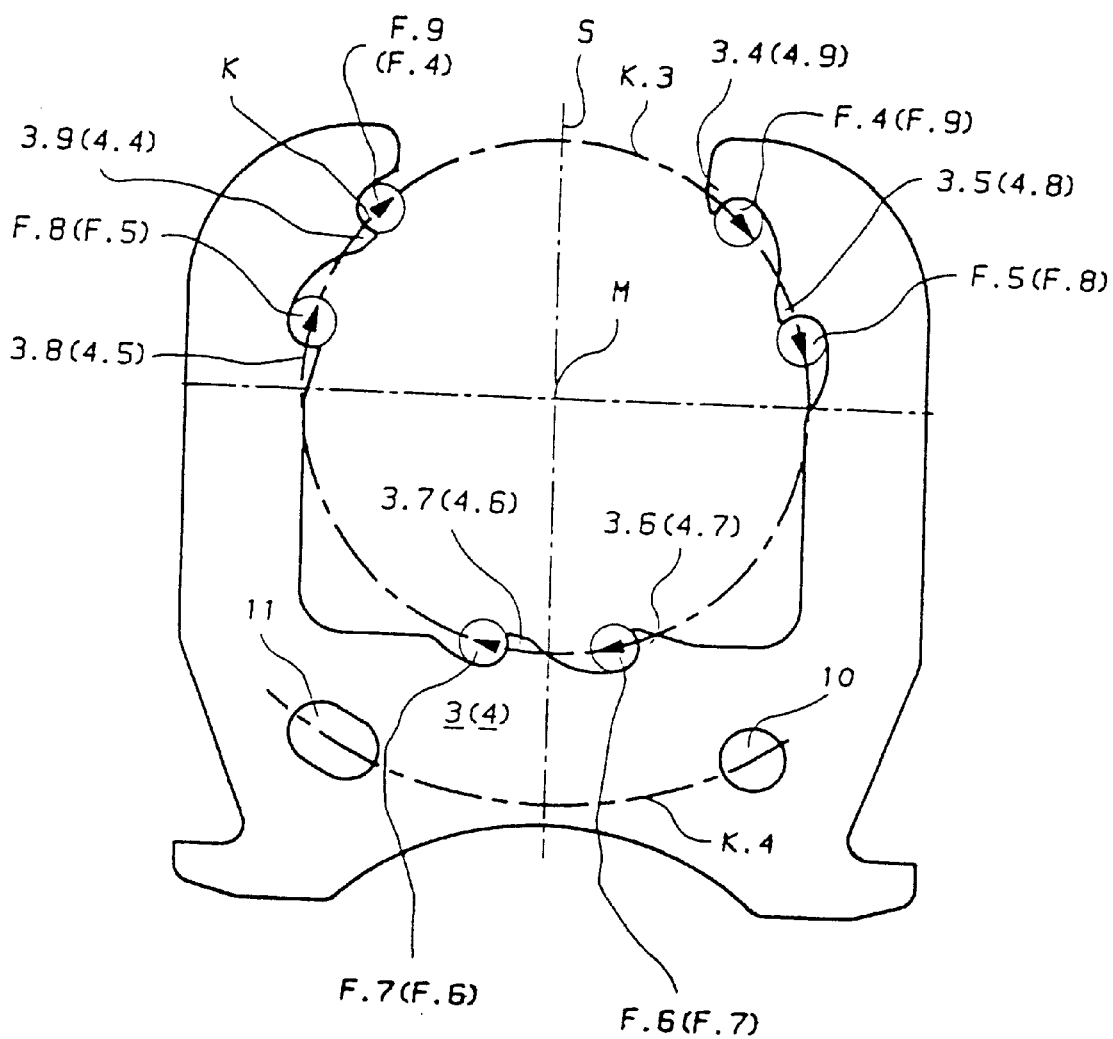
FIG. 4 shows a jaw element for a further, exemplified embodiment of the inventive device.
Figure 5:
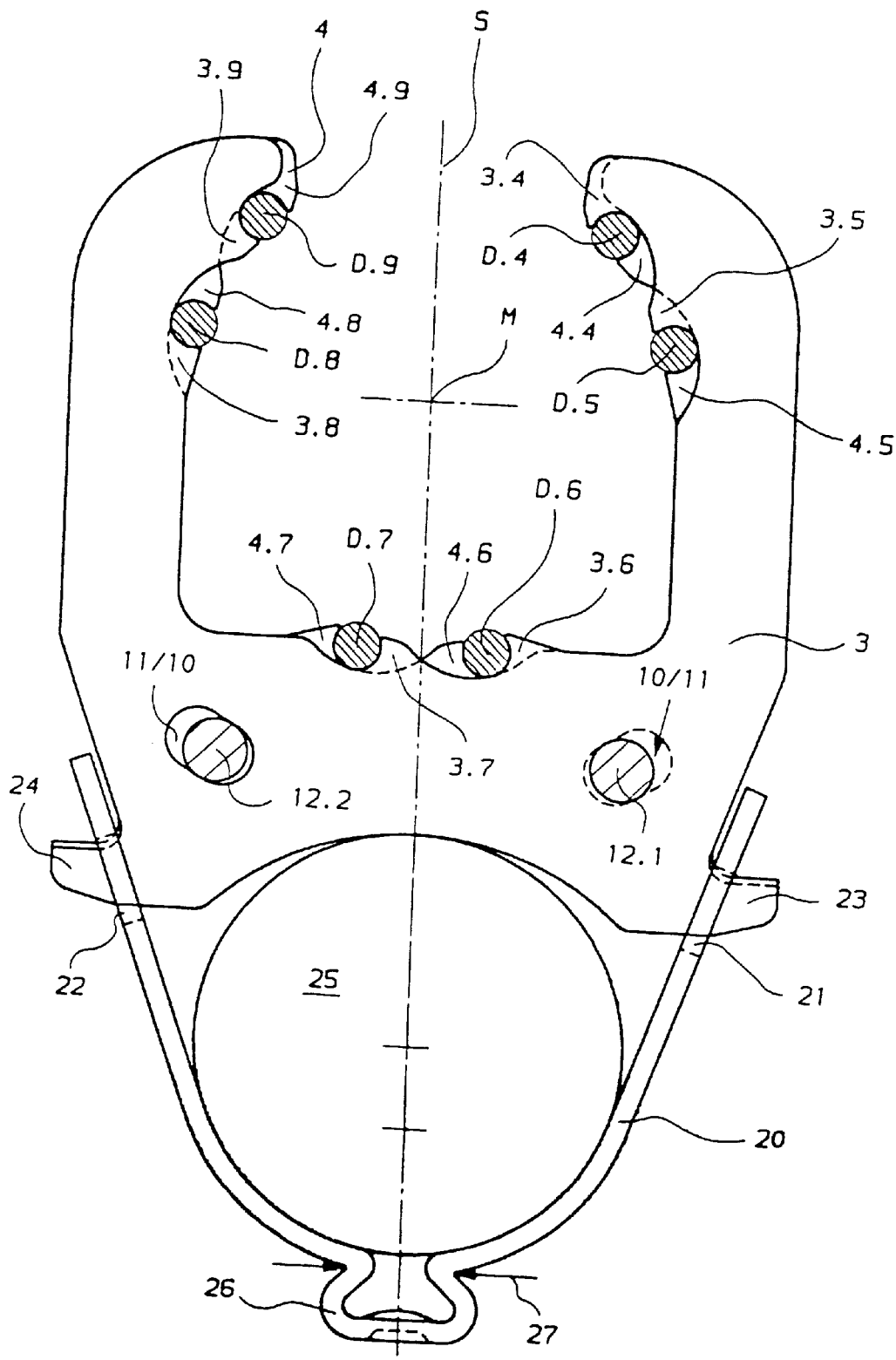
FIG. 5 shows jaw elements according to FIG. 4 lying against each other and being connected to each other which jaw elements are held by holding means in a position in which the pairs of clamping jaws are closed.

FIGS. 4 and 5 show a further exemplified embodiment of the inventive device for fixing wires or objects similar to wires. This is an embodiment with 6 fixing points F.4 to F.9 in which six wires D.4 to D.9 are fixable. The fixing points are arranged on one circle K.3 around a center M in a symmetrical manner, a plane of symmetry S running through the center M and extending perpendicular to the flat expansion of the jaw elements 3 and 4.

FIG. 4 shows a jaw element 3 which comprises a clamping jaw 3.4 to 3.9 for each fixing point F.4 to F.9, whereby the clamping jaws 3.4 to 3.9 are designed for the exertion of clamping forces acting clockwise tangentially to the circle K.3 on wires or objects similar to wires positioned in the fixing points.

Due to the symmetry of the arrangement of the fixing points F.4 to F.9, a jaw element 4 co-operating with the jaw element 3 and having clamping jaws 4.4 to 4.9 (reference numbers in brackets in FIG. 4) is produced by simply rotating the jaw element 3 by 180° around an axis lying in the symmetry-plane S and running through the center M and thus transform it into its mirror image (clamping jaws for counter-clockwise clamping forces).

For the slewable connection of jaw elements 3 and 4 these comprise a circular opening 10 and an opening 11 in form of a slot which openings are arranged on a circle K.4 around M.

FIG. 5 shows jaw elements 3 and 4 according to FIG. 4 arranged lying against each other (jaw element 3 directed towards the viewer). The reference numbers are the same ones as in FIG. 4.

For opening and closing the jaw pairs 3.4/4.4 to 3.9/4.9, the two jaw elements 3 and 4 are restrictedly slewable against each other around the center M due to the fact that bolts 12.1 and 12.2 are positioned in the openings 10 and 11 respectively. The slewability is restricted by the length of the slot-shaped opening 11.

As holding means 20, with which jaw elements 3 and 4 are held in a position in which the jaw pairs 3.4/4.4 to 3.9/4.9 are pressed into a position which is as closed as possible or are pressed against a wire to be fixed, e.g. a spring clip is provided which e.g. has two openings 21 and 22 with which the clip is positionable over correspondingly shaped holding ears 23 and 24 of the jaw elements 3 and 4. The spring clip is deformable with e.g. pliers (arrows 27) in an area 26. This kind of clip is available on the market under the name of OETKER-BRIDE™. The clip serves also for fixing the jaw elements to a support 25 with an e.g. circular cross section, whereby the device and thus the arrangement of fixing points F.4 to F.9 can be arranged in any rotational position relative to the support 25.

FIG. 6 shows an exemplified use of the embodiment of the inventive device for fixing wires as described in connection with FIGS. 4 and 5. The wires D to be fixed form the rails for a transporting means 30 which rolls on groups of three balls 31. This kind of transport means is known from the publication EP-0387318 (or U.S. Pat. No. 5,074,678). The wire-shaped rails are fixed in their relative positions by inventive devices arranged at distances from each other.

As can be seen from FIG. 6 the used devices for fixing the wires do not comprise two but three jaw elements according to FIG. 4 all three jaw elements are identical, whereby the middle jaw element e.g. has an orientation like jaw element 3 in FIG. 5 and the two outer jaw elements have an orientation like jaw element 4 in FIG. 5. In FIG. 6, the jaw elements lying against each other are denominated correspondingly (3/4/3).

It is obvious that the assembly of the rail system according to FIG. 6 with the inventive devices for fixing the wires is considerably more simple than known devices with the same function.

In FIGS. 1 to 6, all wires to be fixed by the inventive device are shown having a circular cross section. It is obvious that wires or objects similar to wires with different cross sections are fixable with the inventive device also, whereby possibly the form of the clamping jaws must be adapted to the specific cross section.

What is claimed is:

1. A device for fixing each wire of a plurality of wires or objects similar to wires having substantially a same cross section in one of a plurality of fixing points, the device comprising:

a first jaw element and a second jaw element each being of approximately a same shape and consisting of a sheet material, the first and the second jaw element being connected to each other and substantially lying against each other and being pivotable relative to each other around an axis;

holding members for driving the first jaw element and the second jaw element towards a predetermined pivot position and for holding the first jaw element and the second jaw element in said predetermined pivot position for fixing the plurality of wires or objects similar to wires;

wherein each of the jaw elements comprises a clamping jaw for each of a plurality of fixing points resulting in at least two cooperating clamping jaws designed to exert a clamping force on a wire or an object similar to a wire at each of the plurality of fixing points said clamping force being directed substantially tangentially to a circle around said axis, wherein the fixing points are arranged on the circle around the axis, each pair of cooperating clamping jaws having a same form and disposed on the first and second jaw element such that the clamping jaws of the first jaw element exert clamping forces of clock-wise direction and the clamping jaws of the second jaw element exert clamping forces of anti-clock-wise direction, said first and second jaw element being driven by the holding members to the pivot position in which the clamping jaws of each fixing point have a smallest possible distance from each other.

2. A device according to claim 1 comprising more than two jaw elements, whereby the jaw elements are arranged alternatingly lying against each other such that with two adjacent jaw elements clockwise clamping forces are exertable by the clamping jaws of one jaw element and counter-clockwise clamping forces are exertable by the clamping jaws of another jaw element.

3. A device according to claim 1, wherein the first and the second jaw element are connected to each other by means of bolts positioned in first and second openings of the first and second jaw element, said openings overlaying each other.

4. A device according to claim 2, wherein the first and the second jaw element are connected to each other by means of bolts positioned in openings of the first and second jaw element, said openings aligned one with the other.

5. A device according to claim 3, wherein the first opening is a circular opening and the second opening has the form of a slot, said first and second opening are arranged on a circle around said axis.

6. A device according to claim 4, wherein the first opening is a circular opening and the second opening has the form of a slot, said first and second opening are arranged on a circle around a center.

7. A device according to claim 1 wherein the holding member is for fixing the device on a support.

8. A device according to claim 2 wherein the holding member is for fixing the device on a support.

9. A device according to claim 3 wherein the holding member is for fixing the device on a support.

10. A device according to claim 4 wherein the holding member is for fixing the device on a support.

11. A device according to claim 5 wherein the holding member is for fixing the device on a support.

12. A device according to claim 6 wherein the holding member is for fixing the device on a support.

13. A device according to claim 1 wherein each clamping jaw has substantially a same shape.

14. A device according to claim 13 wherein the fixing points are arranged on the circle in a symmetrical arrangement having a plane of symmetry containing the axis and the jaw elements are designed such that when the first jaw element is rotated by 180° around the axis, the first jaw element appears as a mirror image of the first jaw element before said first jaw element was rotated.

15. A device for fixing each wire of at least three wires or objects similar to wires having substantially a same cross section in one of at least three fixing points, the device comprising:

a first jaw element and a second jaw element each being of approximately a same shape and consisting of a sheet material, the first and the second jaw element being connected to each other and substantially lying against each other and being pivotable relative to each other around an axis;

holding members for driving the first jaw element and the second jaw element towards a predetermined pivot position and for holding the first jaw element and the second jaw element in said predetermined pivot position for fixing the at least three wires or objects similar to wires;

wherein each of the jaw elements comprises a clamping jaw for each of the at least three fixing points resulting in at least two cooperating clamping jaws designed to exert a clamping force on a wire or an object similar to a wire at each of the three fixing points, said clamping force being directed substantially tangentially to a circle around said axis, wherein the at least three fixing points are arranged on the circle around the axis, each pair of cooperating clamping jaws having a same form and disposed on the first and second jaw element such that the clamping jaws of the first jaw element exert clamping forces of clock-wise direction and the clamping jaws of the second jaw element exert clamping forces of anti-clock-wise direction, said first and second jaw element being driven by the holding members to the pivot position in which the clamping jaws of each fixing point have a smallest possible distance from each other.

16. A device according to claim 15 wherein each clamping jaw has substantially a same shape.

17. A device according to claim 16 wherein the at least three fixing points are arranged on the circle in a symmetrical arrangement having a plane of symmetry containing the axis and the jaw elements are designed such that when the first jaw element is rotated by 180° around the axis, the first jaw element appears as a mirror image of the first jaw element before said first jaw element was rotated.

* * * * *